(12) United States Patent
Baranov et al.

(10) Patent No.: US 10,221,659 B2
(45) Date of Patent: Mar. 5, 2019

(54) AUTOMATED WELL PLACEMENT FOR RESERVOIR EVALUATION

(71) Applicant: Chevron U.S.A. Inc., San Ramon, CA (US)

(72) Inventors: Artem Mikhaylovich Baranov, Houston, TX (US); Kathleen L. Baker, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 1184 days.

(21) Appl. No.: 14/509,325

(22) Filed: Oct. 8, 2014

(65) Prior Publication Data

US 2016/0102530 A1    Apr. 14, 2016

(51) Int. Cl.
*E21B 43/00* (2006.01)
*G06Q 10/10* (2012.01)
(Continued)

(52) U.S. Cl.
CPC .............. *E21B 43/00* (2013.01); *E21B 43/30* (2013.01); *G06Q 10/10* (2013.01); *G06Q 50/06* (2013.01)

(58) Field of Classification Search
CPC ......... E21B 43/00; E21B 43/30; G06Q 10/10; G06Q 50/06
(Continued)

(56) References Cited

U.S. PATENT DOCUMENTS 5,757,663 A * 5/1998 Lo ........................... E21B 49/00
702/12

6,549,879 B1   4/2003 Cullick et al.
(Continued)

FOREIGN PATENT DOCUMENTS

WO    2001/23829    4/2001
WO    2014/039052   3/2014

OTHER PUBLICATIONS

Ierapetritou et al. ("Optimal Location of Vertical Wells: Decomposition Approach", AIChE Journal, 1999, pp. 844-859).*
(Continued)

*Primary Examiner* — Aniss Chad
*Assistant Examiner* — Iftekhar A Khan

(57) ABSTRACT

Automated systems and methods provide a systematic determination of suitable placements for well production zones that comply with specified placement constraints while accounting for information in the geocellular model. One computer-based well placement method embodiment includes: creating a three-dimensional geocellular model of a subsurface region including a reservoir; determining a map-view layout of well candidate zones that satisfies a set of layout parameters; deriving a three-dimensional arrangement of well production zones by testing each well candidate zone's potential vertical positions against a set of arrangement parameters; and storing the three-dimensional arrangement of well production zones on a non-transient information storage medium for use in evaluating production from the reservoir. Where the geocellular model has cell layers that conform to stratigraphic surfaces, the method may further include determining potential vertical positions for each well candidate zone by projecting the well candidate zones from the map-view layout onto layer-centered surfaces.

19 Claims, 5 Drawing Sheets

(51) Int. Cl.
*G06Q 50/06* (2012.01)
*E21B 43/30* (2006.01)

(58) Field of Classification Search
USPC .......................................................... 703/10
See application file for complete search history.

(56) References Cited

U.S. PATENT DOCUMENTS

| | | | |
|---|---|---|---|
| 7,369,973 B2* | 5/2008 | Kennon | G06F 17/5018 367/72 |
| 9,058,445 B2* | 6/2015 | Usadi | G06F 17/5009 |
| 9,411,915 B2* | 8/2016 | Bouzarkouna | G06Q 10/04 |
| 9,422,800 B2* | 8/2016 | Le Ravalec | E21B 43/30 |
| 2004/0153298 A1 | 8/2004 | Colvin et al. | |
| 2005/0149307 A1* | 7/2005 | Gurpinar | E21B 43/00 703/10 |
| 2005/0273303 A1 | 12/2005 | Flandrin et al. | |
| 2007/0199721 A1* | 8/2007 | Givens | G06Q 10/06 166/382 |
| 2007/0219724 A1* | 9/2007 | Li | G01V 1/282 702/12 |
| 2007/0219725 A1* | 9/2007 | Sun | G01V 1/282 702/13 |
| 2009/0066695 A1* | 3/2009 | Maupin | G06T 15/10 345/427 |
| 2009/0204377 A1* | 8/2009 | Van Wagoner | G01V 1/282 703/9 |
| 2009/0216505 A1 | 8/2009 | Sarma et al. | |
| 2010/0057418 A1 | 3/2010 | Li et al. | |
| 2010/0114544 A1 | 5/2010 | Dogru | |
| 2010/0179797 A1 | 7/2010 | Cullick et al. | |
| 2010/0299111 A1* | 11/2010 | Dale | E21B 47/00 703/2 |
| 2010/0312534 A1* | 12/2010 | Xu | G01V 1/50 703/2 |
| 2011/0015910 A1* | 1/2011 | Ran | G06T 17/20 703/2 |
| 2011/0153300 A1 | 6/2011 | Holl et al. | |
| 2011/0168391 A1 | 7/2011 | Saleri et al. | |
| 2011/0290478 A1* | 12/2011 | Sun | G01V 99/00 166/250.01 |
| 2011/0313745 A1 | 12/2011 | Mezghani et al. | |
| 2012/0150501 A1* | 6/2012 | Wu | G01V 99/005 703/2 |
| 2013/0054201 A1* | 2/2013 | Posamentier | G01V 99/005 703/2 |
| 2013/0140037 A1 | 6/2013 | Sequeira, Jr. et al. | |
| 2013/0218537 A1 | 8/2013 | Le Ravalec | |
| 2013/0246031 A1* | 9/2013 | Wu | G06T 17/05 703/10 |
| 2013/0268248 A1 | 10/2013 | Bouzarkouna et al. | |
| 2013/0317798 A1 | 11/2013 | Cheng et al. | |
| 2014/0005996 A1 | 1/2014 | Jain et al. | |
| 2014/0081613 A1 | 3/2014 | Dommisse et al. | |
| 2014/0365192 A1* | 12/2014 | Cheng | E21B 41/00 703/10 |
| 2016/0163116 A1* | 6/2016 | Yarus | G06T 17/05 345/419 |

OTHER PUBLICATIONS

Caumon et al. ("Three-Dimensional Implicit Stratigraphic Model Building From Remote Sensing Data on Tetrahedral Meshes: Theory and Application to a Regional Model of La Popa Basin, NE Mexico", IEEE, 2013, pp. 1613-1621) (Year: 2013).*
Fernandez et al. ("Automated tools within workflows for 3D structural construction from surface and subsurface data", Geoinformatica (2009) 13:291-304) (Year: 2009).*
Badru, O., et al.; "Well Placement Optimization in Field Development"; SPE 84191, Oct. 2003, pp. 1-9.
Ballin, P.R., et al.; "New Reservoir Dynamic Connectivity Measurement for Efficient Well Placement"; SPE 77375, Oct. 2002, pp. 1-10.
Bao, Yu, et al.; "Optimization of a Vertical-Horizontal Heavy Oil Thermal Operation by Using Automated Field-Scale Control"; SPE 165556, Jun. 2013, pp. 1-17.
Emerick, Alexandre A., et al.; "Well Placement Optimization Using a Genetic Algorithm with Nonlinear Constraints"; SPE 118808, Feb. 2009, pp. 1-20.
Wagenhofer, T., et al.; "Optimization of Horizontal Well Placement"; SPE 35714, May 1996, pp. 629-639.
International Search Report, dated Jan. 14, 2016, during the prosecution of International Application No. PCT/US2015/020345.
Written Opinion of the International Searching Authority, dated Jan. 14, 2016, during the prosecution of International Application No. PCT/US2015/020345.

* cited by examiner

Fig. 1
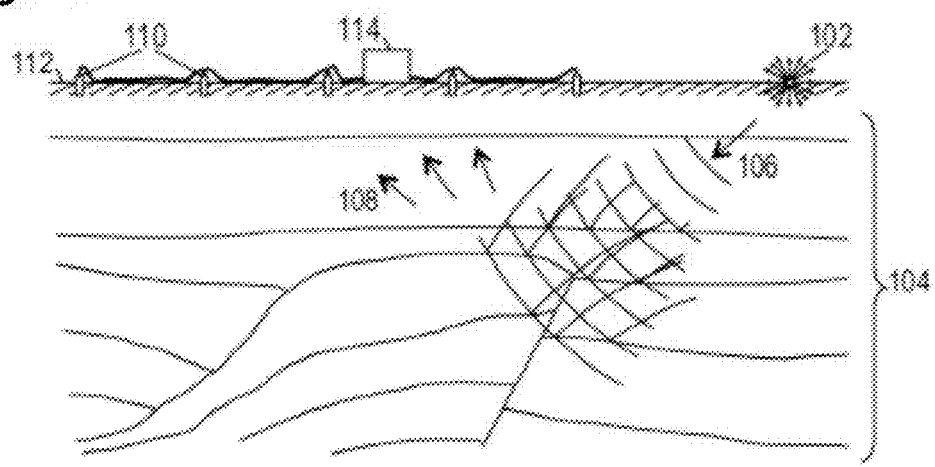
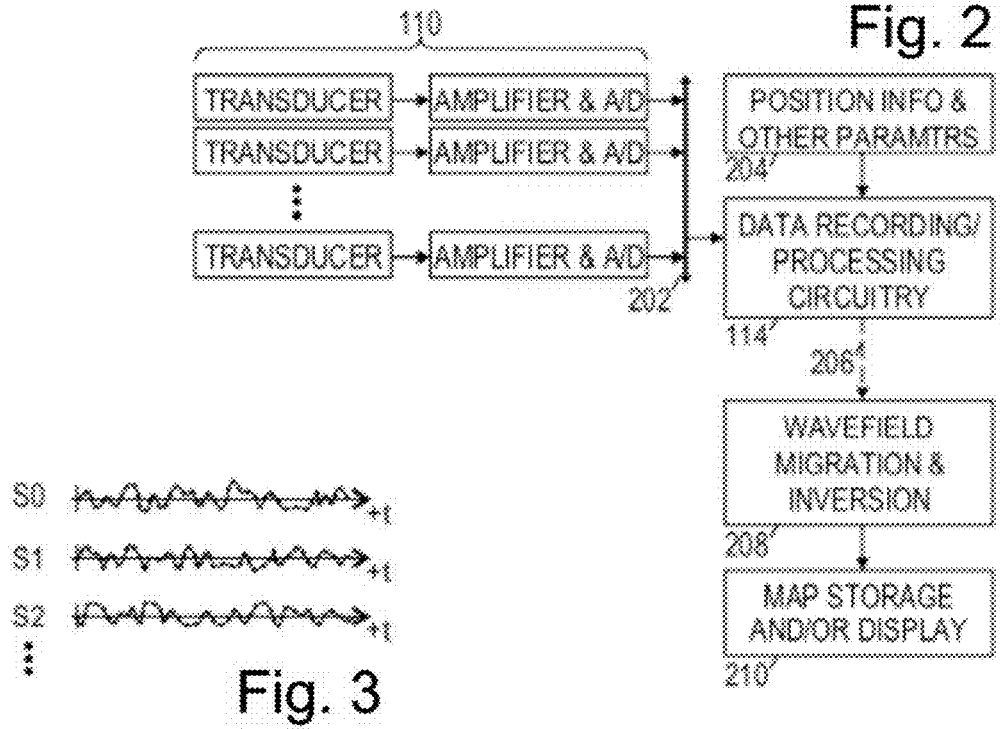
Fig. 2
Fig. 3

AUTOMATED WELL PLACEMENT FOR RESERVOIR EVALUATION

BACKGROUND

The process of estimating oil reserves is only accurate if it accounts for a complex combination of factors including the placement of well production zones. Without careful well placements, the dynamic simulations of reservoir production cannot yield meaningful economic evaluations. Moreover, such dynamic simulations are regularly repeated as the geocellular model gets updated, necessitating frequent re-analysis of suitable well placements.

Given that a typical model must account for thousands of such well production zones, a manual determination and re-determination of suitable placements can become prohibitive. Yet poor results are expected from the use of a random, periodic, or blindly-generated arrangement that fails to account for the information represented in the current geocellular model, and as a consequence the team may be left to rely on well placements derived from outdated geocellular models, despite their probable violation of accepted constraints on production zone placements.

BRIEF SUMMARY

Accordingly, there are disclosed herein automated systems and methods that provide a systematic determination of suitable placements for well production zones that comply with specified placement constraints while accounting for information in the geocellular model. One computer-based well placement method embodiment includes: creating, using a computer, a three-dimensional geocellular model of a subsurface region that includes a reservoir; determining, using a computer, a map-view layout of well candidate zones that satisfies a set of layout parameters; deriving, using a computer, a three-dimensional arrangement of well production zones by testing each well candidate zone's potential vertical positions for compliance with a set of arrangement parameters; and storing, using a computer, the three-dimensional arrangement of well production zones on a non-transient information storage medium for display or use in evaluating production from the reservoir. Where the geocellular model has cell layers that conform to stratigraphic surfaces, the method may further include determining potential vertical positions for each well candidate zone by extracting a layer-centered surface from each cell layer; and projecting the well candidate zones from the map-view layout onto the layer-centered surfaces. Such projecting may be performed iteratively in an order opposite to the anticipated direction of hydrocarbon movement.

An illustrative system embodiment for modeling a subsurface region includes: a memory having an automated well placement software module; and one or more processors coupled to the memory to execute the software module. The software module causes the one or more processors to perform a well placement method that includes: obtaining a three-dimensional geocellular model of a subsurface region including a reservoir; determining a map-view layout of well candidate zones that satisfies a set of layout parameters; deriving a three-dimensional arrangement of well production zones by testing each well candidate zone's potential vertical positions against a set of arrangement parameters; and storing the three-dimensional arrangement of well production zones on a non-transient information storage medium for display or use in evaluating production from the reservoir. The software module may further cause the one or more processors to display a visual representation of the three-dimensional arrangement.

BRIEF DESCRIPTION OF THE DRAWINGS

In the accompanying drawing sheets:

FIG. 1 is a schematic depiction of a seismic survey.

FIG. 2 is a block diagram of a seismic survey system that generates a geocellular model.

FIG. 3 is a graph of illustrative digitized receive signal traces.

Figure 4A:
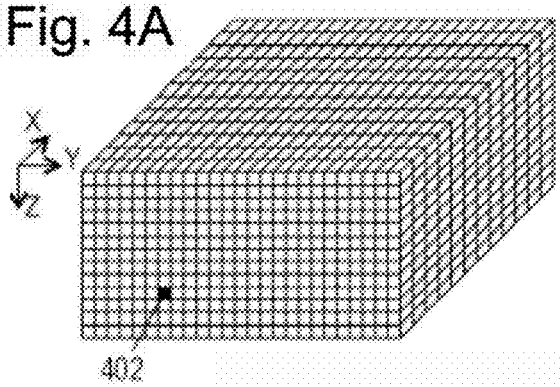
FIG. 4A is an isometric view of a data space representing a subsurface region of interest.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

To put the disclosed automatic well placement systems and methods in context, it is useful to understand how geocellular models are created and used. It all begins with a seismic survey, which can be performed on land or in water. As indicated in FIG. 1, an energy source 102 near the region of interest 104 generates seismic waves 106 that propagate into the region of interest and reflect from internal features such as bed boundaries. Eventually the reflected waves 108 reach an array of receivers 110 on the surface 112. A recording system 114 captures the received signals for storage and processing. The process is repeated with many different source positions and optionally with different receiver positions.

As indicated in FIG. 2, the array of seismic receivers 110 converts the seismic waves to electrical signals that are amplified and digitized. (Illustrative signal waveforms are shown in FIG. 3.) A recording system 114 collects the digitized signals via a bus 202 or other communications pathway and stores the digitized signals on an information storage medium for later processing. Typically, each digitized signal is associated with parameters 204 such as a receiver location and a shot location and such other information as the system designer deems worthwhile. Recording system 114 may perform some initial processing to filter and/or compress the data, and in at least some cases, to perform quality control.

The recording system 114 provides the seismic survey data via the Internet or some other communications mechanism 206 to a data processing center 208 having sufficient computational resources for the imaging process. The data processing center includes one or more computers that may use finite difference wave field modeling to perform wave field propagation and thereby convert the recorded seismic signals into a three dimensional map or "image" of the subsurface structure which can be displayed on a monitor 210 and stored in persistent storage for later use.

Figure 4B:
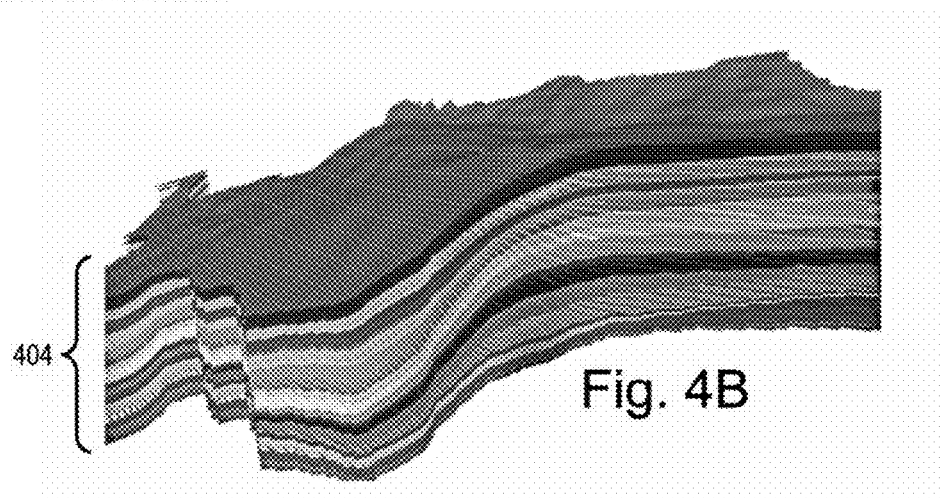
FIG. 4B is a perspective view of illustrative stratigraphic layers represented in the data space.

To simulate the wave field and construct the image, the data processing center models the region of interest as a three-dimensional space divided into an orthogonal grid of cells 402 such as that shown in FIG. 4A. The properties of all of the points within a cell are assumed to be uniform. Typically, the imaging process yields for each cell some measure of reflectivity or coherence, from which the boundaries between the various stratigraphic layers 404 (FIG. 4B) can be extracted. Properties for each layer can be refined and augmented with further analysis, which may include processing to extract velocity, dispersion, and angular dependence of the wave field propagation. Additional sources of information (such as well logs, simulations, and stratigraphic interpretation) may also be exploited to measure, extrapolate, or otherwise estimate properties of each cell.

Figure 4C:
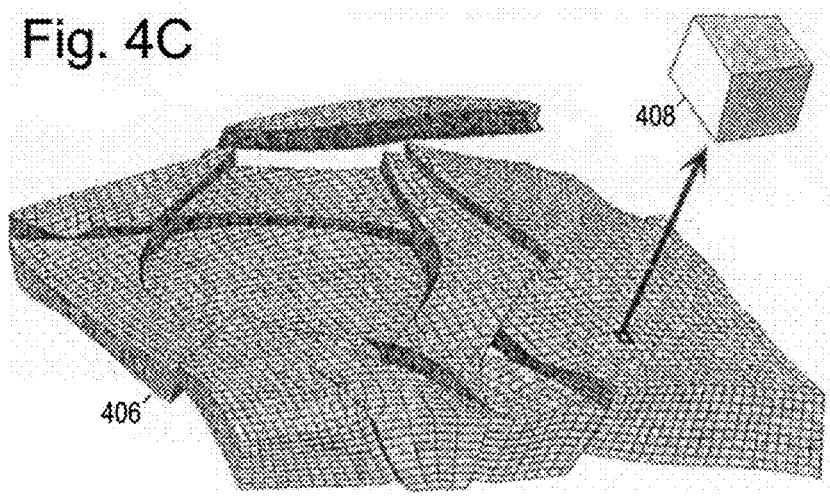
FIG. 4C is a perspective view of an illustrative "stratigraphic grid" representation of a subsurface region of interest.

Once the stratigraphic layers have been extracted, the three dimensional orthogonal grid model may be remapped into a stratigraphic grid model such as that shown in FIG. 4C, or into some other form of conformal cell model. In such models, the cells are not restricted to being rectangular polyhedra, but rather they can each have varying corner angles, different side lengths, and dissimilar face curvatures, while still fully filling the space within the region of interest. Such variability enables the upper and lower faces of each cell layer to conform to seismic or stratigraphic horizons or any other identified boundaries, thereby permitting adequate representation of the region of interest with a greatly reduced number of cells. In addition to enabling more compact digital representations, such models often accelerate simulation of fluid flows throughout the region of interest and facilitate the graphical rendering of selected portions. One commercially available software package that offers remapping to a stratigraphic grid model is Paradigm's GOCAD software.

Figure 5:
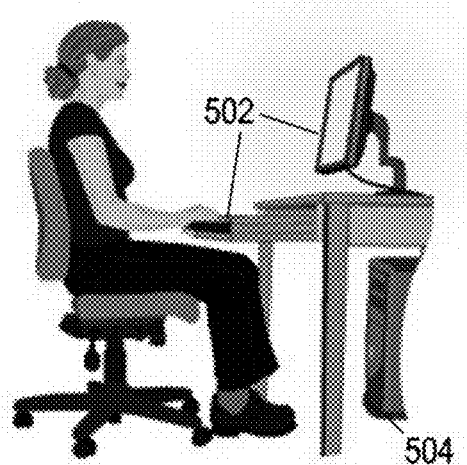
FIG. 5 shows a geomodeler employing an illustrative modeling system.

A shown in FIG. 5, a geo-modeler employs a user interface 502 of a workstation 504 to view and analyze the seismic image. The workstation 504 is part of the hardware platform of a subsurface modeling system such as that shown in FIG. 6. The illustrative hardware platform couples the workstation 504 to one or more multi-processor computers 606 via a local area network (LAN) 604. The one or more multi-processor computers 606 are in turn coupled via a storage area network (SAN) 608 to one or more shared storage units 610. Using the personal workstation 504, the geo-modeler is able to load seismic image data into the system, to configure and monitor the processing of the seismic image data and to retrieve the results from the system, optionally in the form of volumetric images.

Personal workstation 504 may take the form of a desktop computer with a display that shows graphical representations of the input and result data, and with a keyboard that enables the user to move files and execute processing software. LAN 604 provides high-speed communication between multi-processor computers 606 and with personal workstation 504. The LAN 604 may take the form of an Ethernet network.

Multi-processor computer(s) 606 provide parallel processing capability to enable suitably prompt processing of the input data to derive the results data. Each computer 606 includes multiple processors 612, distributed memory 614, an internal bus 616, a SAN interface 618, and a LAN interface 620. Each processor 612 operates on allocated tasks to solve a portion of the overall problem and contribute to at least a portion of the overall results. Associated with each processor 612 is a distributed memory module 614 that stores application software and a working data set for the processor's use. Internal bus 616 provides inter-processor communication and communication to the SAN or LAN networks via the corresponding interfaces 618, 620. Communication between processors in different computers 606 can be provided by LAN 604.

SAN 608 provides high-speed access to shared storage devices 610. The SAN 608 may take the form of, e.g., a Fibrechannel or Infiniband network. Shared storage units 610 may be large, stand-alone information storage units that employ magnetic disk media for nonvolatile data storage. To improve data access speed and reliability, the shared storage units 610 may be configured as a redundant disk array ("RAID").

It is the software that configures the hardware platform to operate as a subsurface geomodeling system with automated well production zone placement. One or more proprietary or commercially available software packages may be installed on the hardware platform to provide the desired functionality. User-authored scripts, workflows, or other programming mechanisms may be employed to customize the operation of the software and automate certain operations such as those outlined below for well production zone placement. Examples of commercially available software that supports the use of such user programming include Paradigm's GOCAD software, which supports the use of TCL ("Tool Command Language") or CLI ("Command Language Interface"), and Schlumberger's Petrel software, which includes a Process Manager for authoring workflows. Both software packages support the use of plug-ins that can be authored in traditional programming languages such as C++. Nevertheless, the implementation of the following methods is not limited to any specific software language or execution environment.

Figure 6:
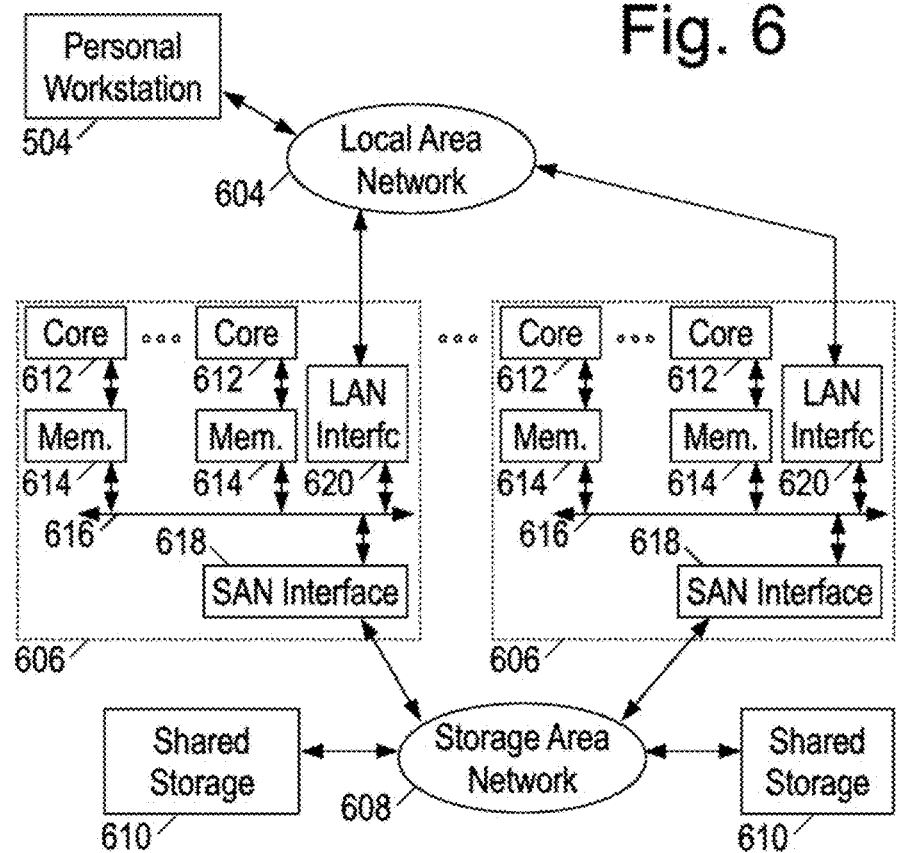
FIG. 6 is a block diagram of an illustrative hardware platform suitable for geocellular modeling.
Figure 7:
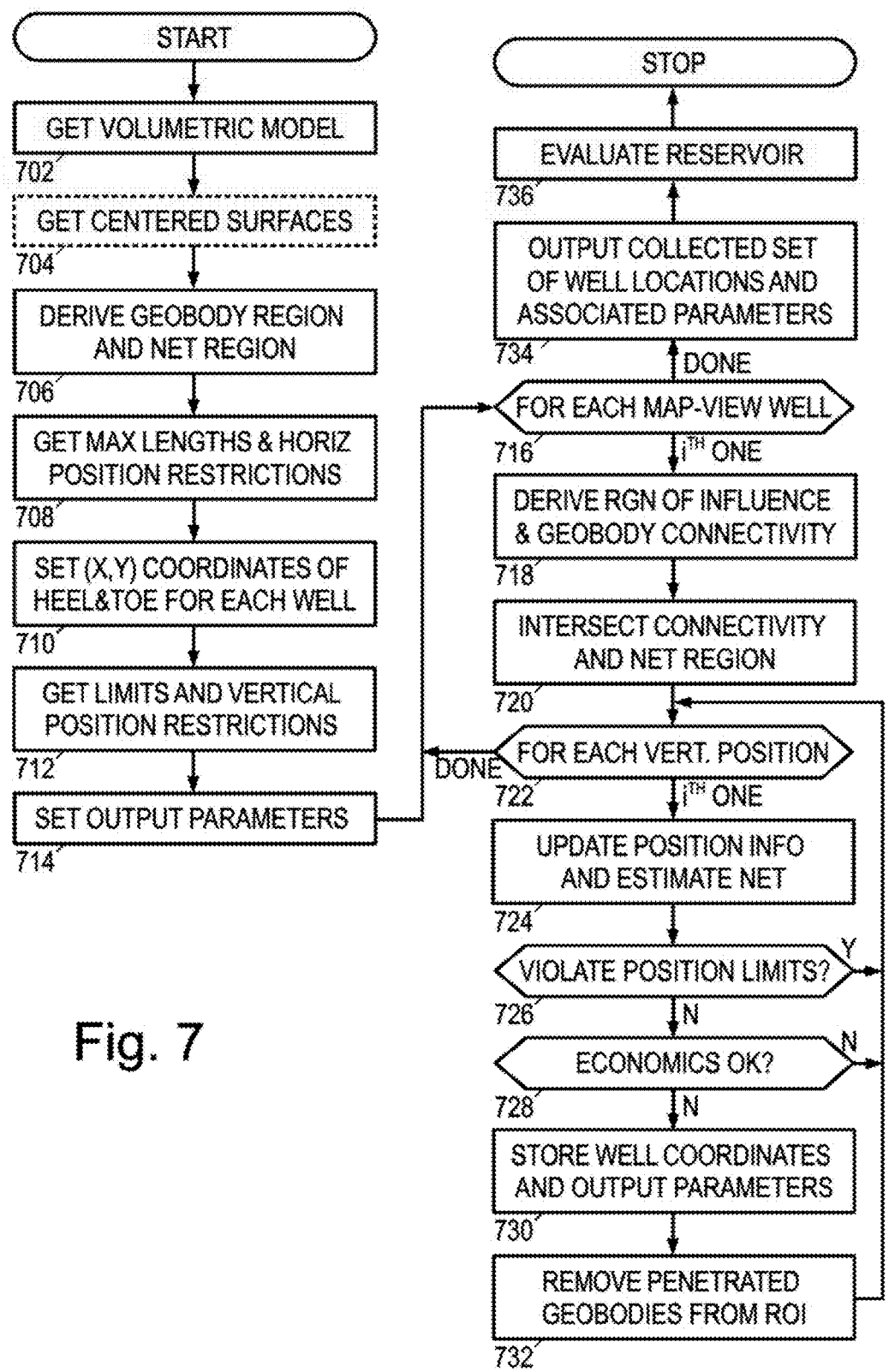
FIG. 7 is a flow diagram of an illustrative reservoir evaluation method using automated well production zone placement.

FIG. 7 is a flow diagram of an illustrative reservoir evaluation method that may be embodied as a user-authored script, workflow, program, plugin, or other executable unit and implemented by the system of FIG. 6. The various blocks may represent individual software modules, though in some embodiments multiple blocks may be implemented as a single module. In block 702, the system establishes access to the stratigraphic model.

As mentioned above, these models have cell layers whose cells have upper and lower faces that conform to stratigraphic horizons or something similar, such as seismic image horizons. In optional block 704, the system derives a set of centered surfaces, each centered surface representing an interpolated surface halfway between the upper and lower faces of a cell layer. Each centered surface can be represented in any suitable fashion including a triangulated mesh.

In block 706, the system analyzes the model to extract geobodies and an associated reservoir quality attribute. Geobodies are groups of connected cells having sufficient permeability to permit fluid flow. Thus, for example, a given geobody may represent a sand layer or a sand bank having boundaries defined by interfaces with shale or other relatively impermeable rock. The reservoir quality attribute is an indicator of hydrocarbon saturation or hydrocarbon concentration. Those portions of geobodies having sufficient levels of hydrocarbon saturation or concentration may be flagged as being "net" regions, i.e., portions of the subsurface model volume that can contribute to hydrocarbon production and which are therefore "countable".

In block 708, the system obtains a set of parameters that are to be used for arranging well candidate zones within a horizontal slice or map view of the model. (As used herein, the term "well candidate zone" refers to line segment or other two-dimensional path within the horizontal slice or map view, above or below which various candidate positions will be evaluated for suitability as a well production zone.) The set of layout parameters may include, for example, a minimum end-to-end spacing between well candidate zones, a minimum side-to-side spacing between well candidate zones, a minimum well candidate zone length, and a maximum well candidate zone length.

The set of layout parameters may further include one or more bounding boxes, or "pads", each serving to further constrain the placement of the well candidate zones. Depending on the implementation rules, the well candidate zones may be completely contained within a given pad, i.e., to not cross a pad boundary. In such a case, the layout parameters may further include a minimum end spacing of the candidate zone relative to a boundary and a minimum side spacing of the candidate zone relative to a boundary. Where multiple pads exist, the system may determine the layout of a given pad's well candidate zones independently of those for other pads.

The layout parameter set may further include a preferred candidate zone orientation, e.g., east-west, north-south, or along some other compass azimuth. In the absence of a specified orientation, the system may take the orientation of the longest pad boundary as the preferred orientation for the candidate zones.

In block 710, the system identifies a map-view layout of well candidate zones within each pad. That is, the horizontal (X-axis and Y-axis) coordinates of each well candidate zone are determined. The horizontal coordinates of the two endpoints of each candidate zone (also known as the heel and toe of the well) are one convenient way to represent the map-view position of each candidate zone, though other suitable representations exist and may be used. Though some system embodiments restrict the well candidate zones to straight lines in the map-view, it is contemplated that some alternative embodiments may permit the well candidate zones to be curved lines in the map-view.

There are a number of approaches that may be employed by the system to determine the layout of well candidate zones in block 710. One suitable layout strategy calculates the maximum number of well candidate zones that can fit within each pad without violating the layout parameter constraints, then determines an even distribution of that number of zones across that pad.

Figure 8:
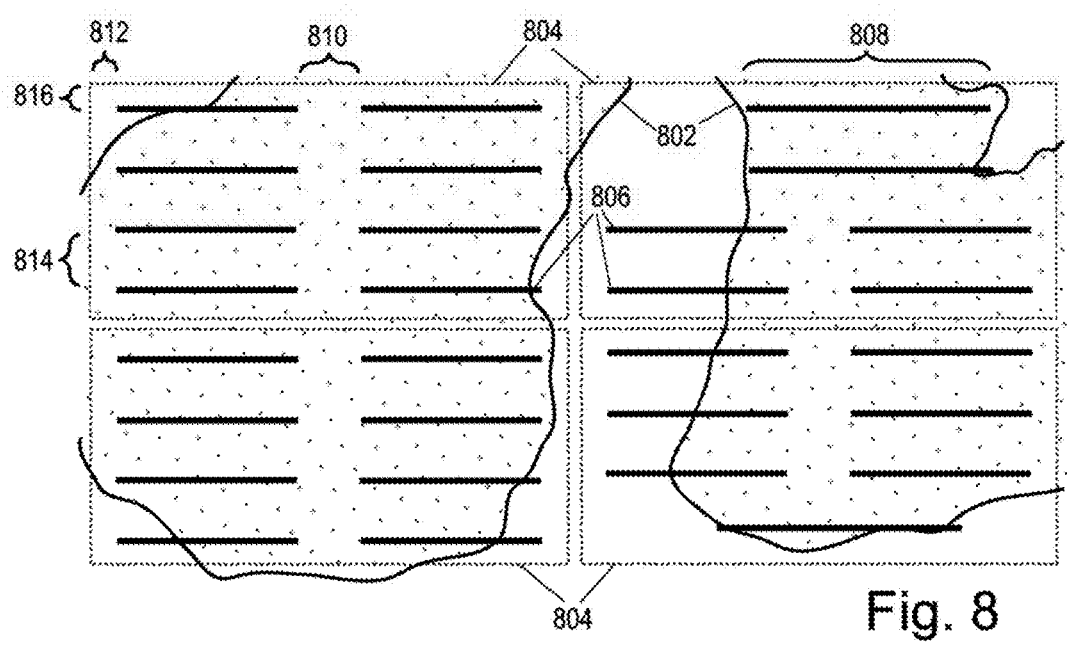
FIG. 8 is an illustrative map view of certain automatically placed well candidate zones.

Another suitable layout strategy is represented in FIG. 8, which shows a map view with projections 802 of the underlying geobodies. The map view further illustrates four pads 804, shown as rectangular bounding boxes, within which well candidate zones 806 are being arranged. At least one candidate zone has the maximum well candidate zone length 808. The minimum end-to-end spacing 810 and the minimum end-to-boundary spacing 812 are honored throughout the layout, as is the minimum side-to-side spacing and the minimum side-to-boundary spacing 816. In deriving this layout, the system took the long boundary of the pads as the preferred well orientation and divided the short boundary length by the minimum side-to-side spacing (accounting for the side-to-boundary spacing constraints) to determine the number and placement of candidate zone rows. Within each row, the number and length of well candidate zones are selected in a manner that maximizes the length of the well candidate zones that overlap the geobody projections 802. Other layout optimization strategies would also be suitable.

Returning to FIG. 7, the system in block 712 determines the restrictions on the vertical placement of the well production zones. This set of arrangement parameters may include, e.g., a minimum vertical distance relative to a stratigraphic boundary, a minimum vertical distance relative to another well production zone, and a minimum economic indicator value. Suitable economic indicators may include a minimum average or total net value derived from a measure of the well production zone's contact with hydrocarbon-containing geobodies. (The net regions identification was performed in block 706. The total net value is the number of net cells contacted by the production zone. The average net value is the total net value divided by the length of the well production zone.)

In block 714, the system obtains the desired output parameters to be collected and reported and potentially employed to evaluate the arrangement of well production zones and/or the subsurface region through which they are arrayed. These output parameters are expected to be properties associated with the stratigraphic model cells contacted by well production zones and/or values that are derivable from those individual cell properties or the cumulative properties provided by the aggregation of those cells. Thus, for example, the output parameters may be specified by the user to be a total volume of hydrocarbon accessible by the collection of wells, or the economic value thereof with a penalty that accounts for the cost and projected production rate from each well.

In FIG. 7, blocks 716-732 represent an outer loop, with blocks 722-732 further representing an inner loop nested within the outer loop. Iteration of the outer loop is controlled in block 716, with the system iterating through each of the well candidate zone locations that have been determined within the map view layout.

Figure 9:
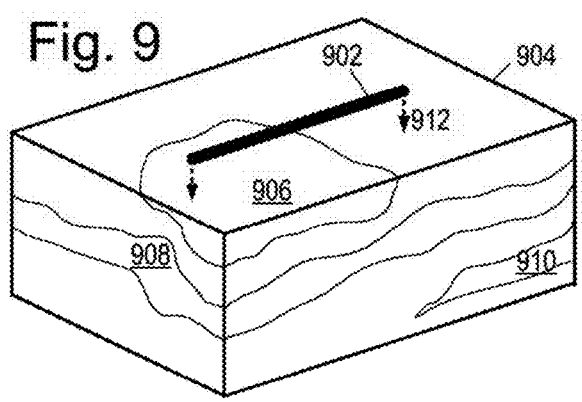
FIG. 9 is an isometric view of a well candidate zone projected into a subsurface volume.

For each well candidate zone location 902, the system determines a region of influence 904 such as that shown in FIG. 9. The region of influence may be determined in a number of ways, and in at least one embodiment, the system relies on a programmable distance parameter to estimate the maximum horizontal extent of the volume that is drainable by the well candidate zone. In the example of FIG. 9, this parameter is applied in an orthogonal, straight-line fashion to define the region of influence as a rectangular volume 904.

In at least some embodiments, the programmable distance parameter is further applied to limit the length of the connected path by which fluid flows to the well candidate zone. Thus where impermeable islands or concave surfaces would lengthen the flow path lengths from distant permeable model cells to the well candidate zone beyond the limit, such cells may be excluded from the region of influence.

In block 720 (FIG. 7), the region of influence is intersected with the permeable geobodies (e.g., geobodies 906, 908, and 910 in FIG. 9), to identify the volume that is potentially drainable within this region of influence. Recall from block 704 that a set of centered surfaces have been obtained from the stratigraphic model. The inner loop, whose iteration is controlled by block 722, iterates through the set of potential vertical positions for each candidate production zone in a direction opposite the anticipated flow direction. Thus, for example, if the hydrocarbon is expected to reach the well production zone by gravity drainage, the iteration progresses in a bottom-to-top direction. Conversely, if the hydrocarbon is expected to be lifted to the well production zone by, e.g., a buoyant water interface, the iteration progresses in a top-to-bottom direction.

The set of potential vertical positions for a given well production zone can be determined in a number of ways in block 722. In at least some embodiments, the system indexes through the set of centered surfaces from block 704, so that in block 724, the map-view location of the well is projected (arrows 912 in FIG. 9) on the presently-indexed centered surface, such that as the iteration progresses, the horizontal well coordinates are combined with the vertical coordinates of each of the centered surfaces in turn. That is, if the map-view well candidate zone were taken to define a segment of a plane or curved surface extending in a vertical direction, the intersection of that plane with each centered surface is taken in turn as a candidate three-dimensional path for the well production zone. In other embodiments, the vertical position of the candidate production zone is stepped in fixed increments through the range of potential vertical positions.

Regardless of how the vertical position is determined, the system analyzes the model cells along the resulting three-dimensional path to measure the total net or average net. As explained previously, the identification of net regions was performed in block 706. The total net value is the number of net cells that are drainable via the three dimensional path. The average net value is the total net value divided by the length of the well production zone. Alternatively, the evaluation of this potential well placement may rest on other output parameters including total drainable hydrocarbon volume or value.

In block 726, the system determines whether the three dimensional path complies with the constraints set by the arrangement parameters. For example, if the well path is too close to a stratigraphic horizon, then it may be rejected as unsuitable. (Such limits may be necessitated by uncertainty in the precise location of the stratigraphic horizon.) As another example, if a well location has been selected on a previous centered surface, the current location may be required to be separated from that (or any other well paths) by at least a minimum vertical distance, or else be rejected as unsuitable.

In block 728, the system evaluates the economics of the current well location by comparing the net value, the average net value, or some other economic indicator to a threshold value. If it is insufficient, the current location is rejected as unsuitable. Upon any determination that the current centered surface is unsuitable, the inner loop returns to block 722 to begin a new iteration with the next centered surface.

Otherwise, in block 730, the system stores the coordinates (horizontal endpoints of the map view and vertical coordinates of the centered surface at that location) of the current well production zone, and stores the associated output parameters that may be derived using those coordinates and the relevant properties from the stratigraphic model.

In block 732, those model cells that are drainable from the current well production zone are converted to "drained" model cells and removed from the drainable model volume that was determined in block 720. The iteration completes with a return to block 722 to begin again with the next centered surface. Once all centered surfaces have been evaluated and found to be unsuitable or to be hosts of well production zones, block 722 completes the inner loop and returns control to block 716 to repeat the outer loop beginning with the next map-view well candidate zone. In this fashion, the system may determine none, one, or more well production zones to be associated with each map-view well candidate zone in the layout, with the sum total of the selected well production zones satisfying both horizontal layout and vertical arrangement constraints that at least approximate the likely well production zone locations that an expert would select.

Once the system in block 716 determines that all the map-view well candidate zone positions have been processed to determine well production zone locations, the system displays the full set of well production zones in block 734, along with the associated output parameters or some summary thereof. The well production zone locations and associated parameters may further be stored on a non-transient information storage medium for later use and processing. Such later processing may be performed by the system in block 736. One illustrative processing operation may be the dynamic simulation of production from the reservoir geobodies based on the selected set of well production zones, enabling the system to provide a useful evaluation of the economics associated with the subsurface region of interest.

Numerous other variations and modifications will become apparent to those skilled in the art once the above disclosure is fully appreciated. It is intended that the following claims be interpreted to embrace all such variations and modifications.

What is claimed is:

1. A computer-based well placement method that comprises:
    creating, using a computer, a three-dimensional geocellular model of a subsurface region comprising a reservoir, wherein the three dimensional geocellular model has a plurality of cell layers that conform to a plurality of stratigraphic surfaces;
    determining, using a computer, a map-view layout of well candidate zones that satisfies a set of layout parameters;
    deriving, using a computer, a three-dimensional arrangement of well production zones by testing each well candidate zone's potential vertical positions against a set of arrangement parameters, wherein determining potential vertical positions for each well candidate zone comprises:
        extracting a layer-centered surface from each cell layer; and
        projecting well candidate zones from the map-view layout onto the layer-centered surfaces; and
    storing, using a computer, the three-dimensional arrangement of well production zones on a non-transient information storage medium for display or use in evaluating production from the reservoir.

2. The method according to claim 1, wherein said projecting is performed iteratively in an order opposite to an anticipated hydrocarbon movement direction.

3. The method according to claim 1, wherein the set of arrangement parameters includes one or more of:
    a minimum vertical distance relative to a stratigraphic boundary,
    a minimum vertical distance relative to another well production zone, and
    a minimum economic indicator value.

4. The method according to claim 3, wherein the minimum economic indicator value comprises a minimum average or total net value derived from a measure of the well production zone's contact with hydrocarbon-containing geobodies.

5. The method according to claim 4, wherein the measure accounts for at least one limit on a region of influence for the well candidate zone.

6. The method according to claim 1, wherein the set of layout parameters includes one or more of:
a minimum end-to-end well candidate zone spacing,
a minimum side-to-side well candidate zone spacing,
a maximum length limitation for each well candidate zone, and
a minimum length limitation for each well candidate zone.

7. The method according to claim 6, wherein the set of layout parameters includes one or more of:
a minimum end spacing relative to a pad boundary, and
a minimum side spacing relative to a pad boundary.

8. The method according to claim 1, wherein the map-view layout maximizes map-view reservoir contact subject to the set of layout parameters.

9. The method according to claim 1, wherein the map-view layout maximizes, subject to the set of layout parameters, a total length of well candidate zones.

10. The method according to claim 1, further comprising using the three-dimensional arrangement of well production zones to simulate hydrocarbon production and thereby estimate an economic value of hydrocarbon reserves in the region.

11. A system for modeling a subsurface region, the system comprising:
a memory having an automated well placement software module; and
one or more processors coupled to the memory to execute the software module, the software module causing the one or more processors to perform a well placement method that includes:
obtaining a three-dimensional geocellular model of a subsurface region comprising a reservoir, wherein the three dimensional geocellular model has a plurality of cell layers that conform to a plurality of stratigraphic surfaces;
determining a map-view layout of well candidate zones that satisfies a set of layout parameters;
deriving a three-dimensional arrangement of well production zones by testing each well candidate zone's potential vertical positions against a set of arrangement parameters, wherein determining potential vertical positions for each well candidate zone comprises:
extracting a layer-centered surface from each cell layer; and
projecting well candidate zones from the map-view layout onto the layer-centered surfaces; and
storing the three-dimensional arrangement of well production zones on a non-transient information storage medium for use in evaluating production from the reservoir.

12. The system according to claim 11, wherein the software module further causes the one or more processors to display a visual representation of the three-dimensional layout.

13. The system according to claim 11, wherein said projecting is performed iterative in an order opposite to an anticipated hydrocarbon movement direction.

14. The system according to claim 11, wherein the set of arrangement parameters includes one or more of:
a minimum vertical distance relative to a stratigraphic boundary,
a minimum vertical distance relative to another well production zone, and
a minimum economic indicator value.

15. The system according to claim 14, wherein the minimum economic indicator value comprises a minimum average or total net value derived from a measure of the well production zone's contact with hydrocarbon-containing geobodies, wherein the measure accounts for at least one limit on a region of influence for the well production zone.

16. The system according to claim 11, wherein the set of layout parameters includes one or more of:
a minimum end-to-end well candidate zone spacing,
a minimum side-to-side well candidate zone spacing,
a maximum length limitation for each well candidate zone,
a minimum length limitation for each well candidate zone,
a minimum end spacing relative to a pad boundary, and
a minimum side spacing relative to a pad boundary.

17. The system according to claim 11, wherein the map-view layout maximizes map-view reservoir contact subject to the set of layout parameters.

18. The system according to claim 11, wherein the map-view layout maximizes, subject to the set of layout parameters, a total length of well candidate zones.

19. The system according to claim 11, further comprising a reservoir evaluation software module that employs the three-dimensional arrangement of well production zones to simulate hydrocarbon production and derive an estimate an economic value of hydrocarbon reserves in the region.

* * * * *